United States Patent Office 3,605,698
Patented Sept. 20, 1971

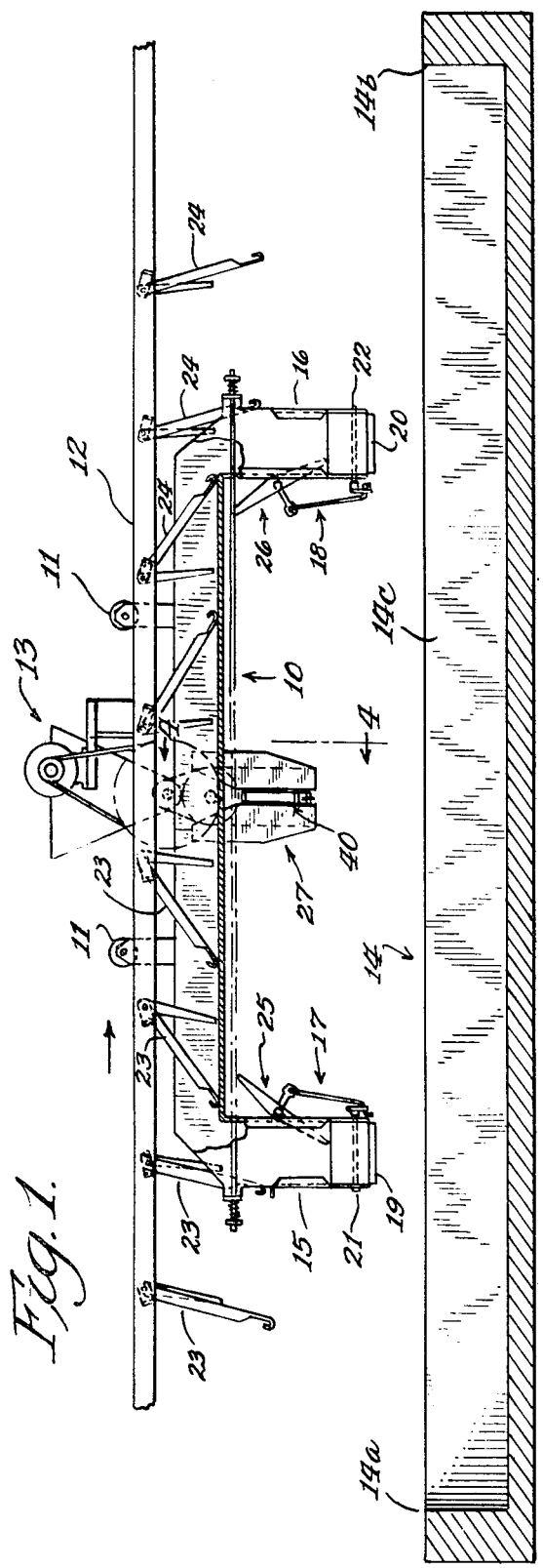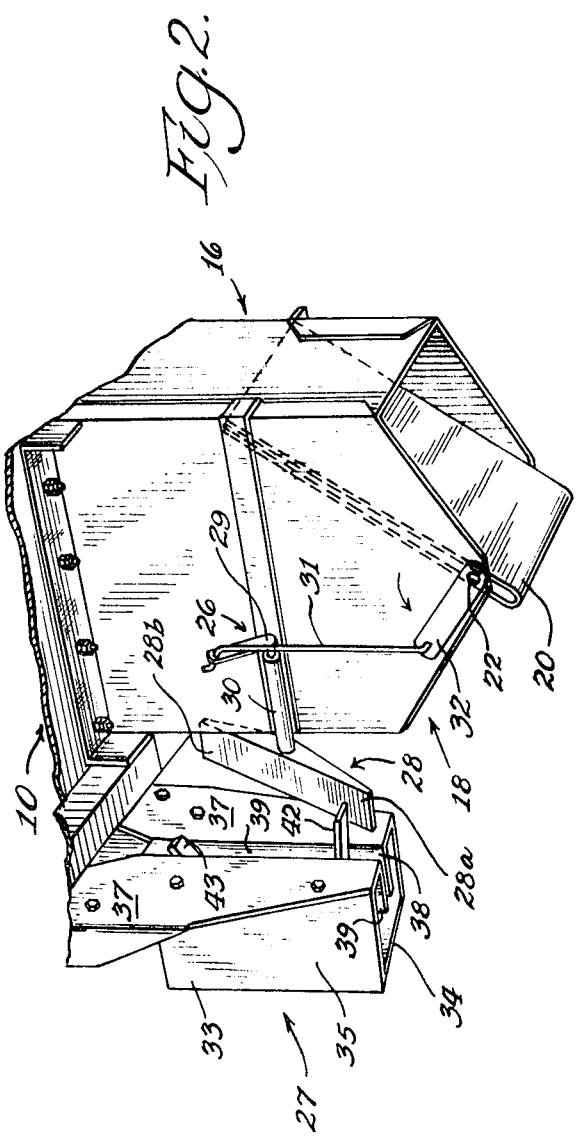

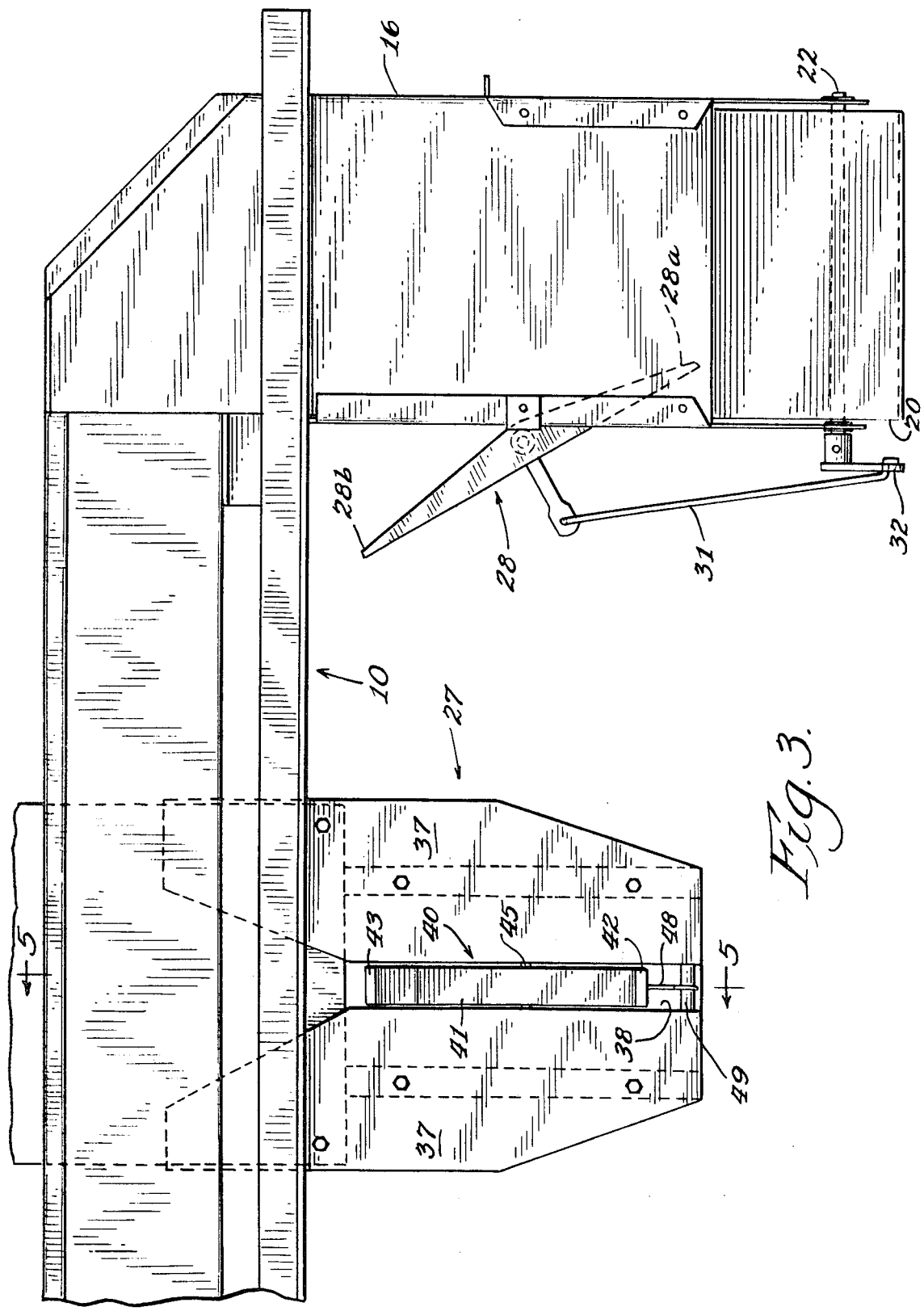

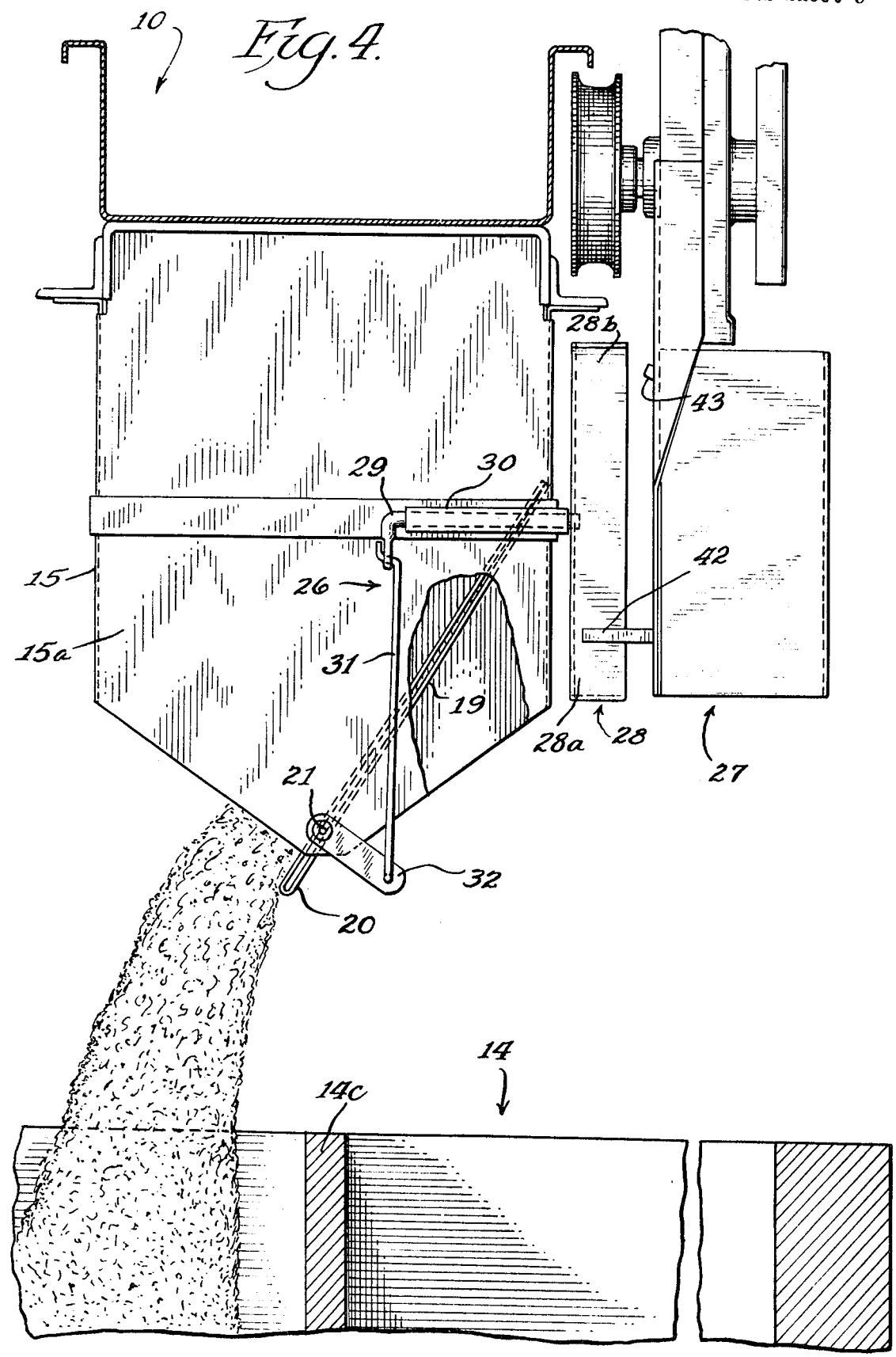

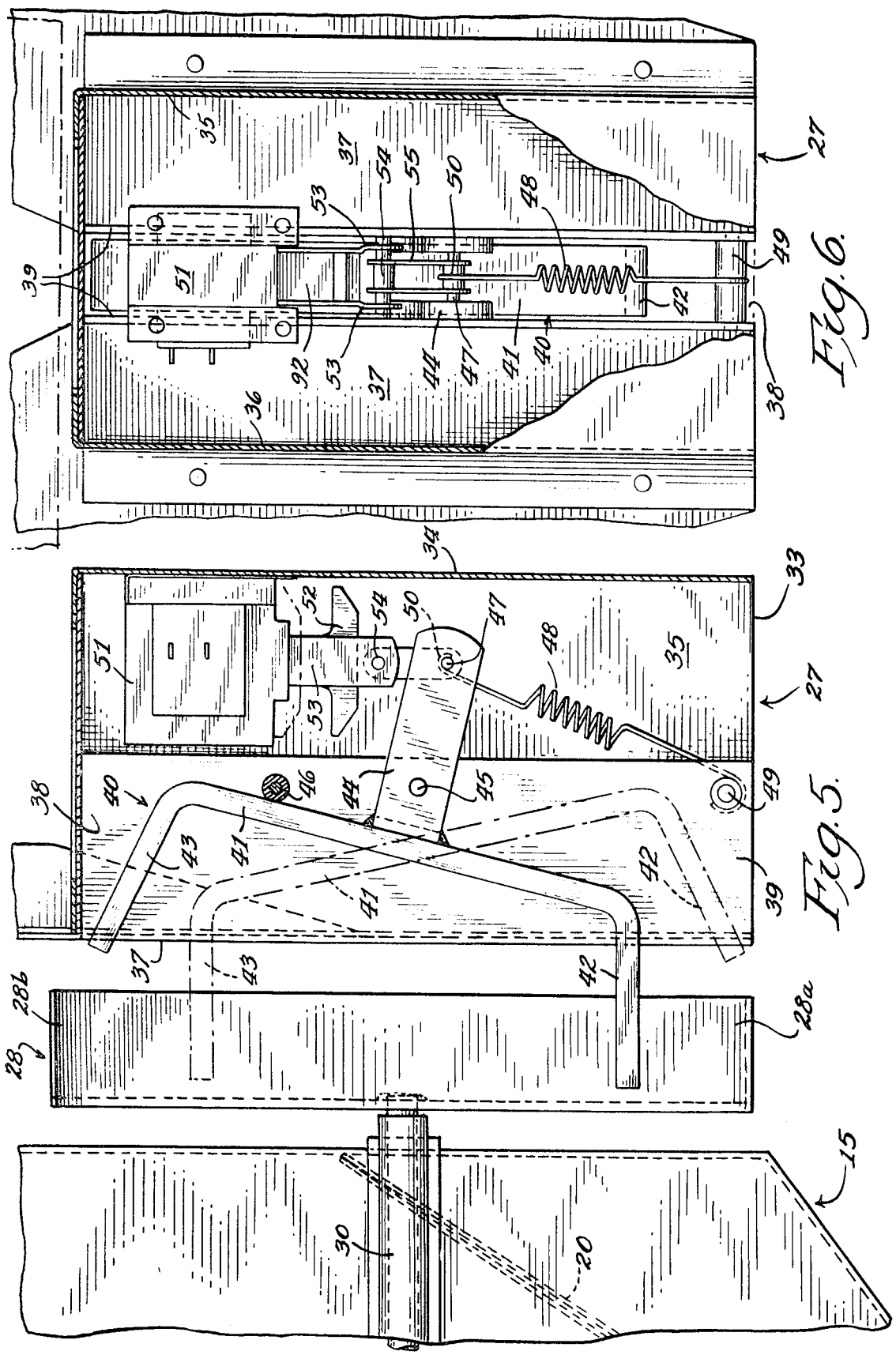

3,605,698
SWEEP SHUTTLE FEEDER WITH AUTOMATIC LATERAL DIVERTER
Michael M. Thyberg, Walworth, Wis., assignor to Starline, Inc.
Filed Mar. 4, 1970, Ser. No. 16,435
Int. Cl. A01k 5/00; B65g 47/44
U.S. Cl. 119—52
11 Claims

ABSTRACT OF THE DISCLOSURE

An animal feeding device, commonly known as a sweep shuttle feeder, has a trough with a discharge chute at each end which reciprocates longitudinally in a path of travel beneath a feed supply source and above a feed bunk, and sweep means causes feed received in the trough from the supply source to be discharged through one chute or the other and scattered along the feed bunk as the trough reciprocates. The feed bunk is provided with a longitudinal partition, and lateral diverter panels are pivotally mounted in the discharge chutes for movement between first and second inclined positions to direct feed toward one side or the other of the partition. Pivoted control arms and linkage means on the chutes move the diverter panels from one position to the other in response to the operation of actuating means which are remotely controllable by an operator.

BACKGROUND OF THE INVENTION

This invention constitutes an improvement upon the type of feeder disclosed in Loesch U.S. Pat. 3,403,773, and is also applicable to feeders of the type disclosed in Haen et al. U.S. Pat. 3,428,027. Such feeders lack any means of discharging measured quantities of feed to both sides of a feed bunk which is divided by a longitudinal partition, so as to permit animals to feed from both sides of the bunk without interfering with one another. The absence of such means also makes it impossible to discharge different rations to the two sides of such a feed bunk.

While sweep shuttle feeders provided with lateral diverters are known, heretofore the diverters have had to be moved manually from one position to another; and this requires labor on the part of an operator and also delays the operation of the feeder while the diverters at the two ends of the trough are individually moved.

SUMMARY OF THE INVENTION

In accordance with the present invention, lateral diverters in the discharge chutes at the two ends of a sweep shuttle feeder are mechanically moved from one position to another by an apparatus which may be remotely controlled by an operator.

In a preferred form of the invention, a pair of control arms, one for each discharge chute, are positioned alongside the chutes in a common vertical plane on control arm pivots which extend transversely in a common horizontal plane and are midway between the ends of the control arms; and a linkage connects each control arm with a diverter panel in the chute so that pivotal movement of the control arms moves the diverter panels. The arms are so positioned that each occupies an angle of about 30° to the vertical in either position of the diverter panel; and in one position the upper ends of the arms are closest to the transverse median plane of the path of travel of the trough, while in the other position the lower ends of the arms are closest to said plane. As the trough reciprocates the closer ends of the arms cross said median plane, while the more distant ends of the arms do not reach said plane.

Actuating means for the control arms is a vertically oriented actuating fork which is mounted on the transverse median plane of the path of travel of the trough on an axis parallel to the side wall of the trough, and in the same horizontal plane with the control arm pivots. The fork has a carrier arm with a transversely extending actuating finger at each end, and each actuating finger is positioned so that it may be contacted by an end portion of each control arm when that end portion crosses the median plane. The fork rocks between a first position in which the lower finger projects into the path of travel of the control arms and a second position in which the upper finger projects into said path. A tension spring urges the fork to the first position, and a solenoid may be energized to move the fork to the second position.

Thus, if the diverter panels in the discharge chutes are in a first position with the upper ends of the control arms closer to the transverse median plane, and the actuating fork is in its first position, the diverters remain in such first positions until an operator wishes to move them to their second positions. To do so he closes a control switch to energize the solenoid, which rocks the fork to project the upper finger into the path of travel of the control arm. As the trough reciprocates each control arm strikes the actuating finger as its upper end portion crosses the median plane, and the arms are pushed to a reverse position and thus reverse the diverters which remain in their second positions as long as the solenoid remains energized. Upon de-energization of the solenoid the spring returns the fork to its first position in which the lower actuating finger projects into the path of the control arms; and since in the second position of the arms their lower end portions are closer together and cross the median plane as the trough reciprocates, the lower finger is struck by the lower portions of the arms to return the arms and the diverter panels to their first position.

The switch may be manually controlled, or in a more sophisticated system it may be closed automatically after the trough has reciprocated for a predetermined number of cycles, and may then be opened automatically after another predetermined number of cycles. The number of cycles may be varied by a manually set control so as to put the same quantity of feed on both sides of the feed bunk, or different quantities on the two sides; and to put larger or smaller quantities on each side.

DESCRIPTION OF THE DRAWINGS

FIG. 1 is a somewhat schematic side elevational view, partially in section, of apparatus embodying the invention with a reciprocating trough substantially midway of its path of travel;

FIG. 2 is a fragmentary perspective view on an enlarged scale illustrating the discharge chute which is at the right hand end of FIG. 1 as it approaches the actuating means with the diverter control arm about to be pivoted from the position of FIG. 2 to the position of FIG. 1;

FIG. 3 is a fragmentary side elevational view on an larged scale illustrating the actuating fingers in the position they are occupying in FIG. 2 and with the diverter control arm inthe position that it occupies in FIG. 1;

FIG. 4 is a fragmentary sectional view on an enlarged scale with a part broken away and taken substantially as indicated along the line 4—4 of FIG. 1;

FIG. 5 is a fragmentary section on an enlarged scale taken substantially as indicated along the line 5—5 of FIG. 3, the actuating fingers being illustrated in full line in their first position and in broken lines in their second position; and FIG. 6 is a rear elevational view taken from the right of FIG. 5 with the rear wall of the actuator housing broken away to show the components of the actuating means.

DETAILED DESCRIPTION OF THE INVENTION

Referring to the drawings in greater detail, and referring first to FIGS. 1 and 4, the apparatus of the present invention comprises a sweep shuttle feeder including a feed trough indicated generally at 10, which is provided with rollers 11 by means of which it is suspended from a pair of parallel tracks 12 for reciprocation beneath a central feed supply source 13 and above a feed box indicated generally at 14. The feed trough 10 is provided at its two ends with discharge chutes 15 and 16, and the feed trough is reciprocable between limit positions in the first of which the discharge chute 15 is adjacent the feed bunk end wall 14a and the chute 16 is immediately adjacent the supply source 13; and a second limit position in which the chute 15 is adjacent the feed supply source, and the chute 16 is adjacent the feed box end wall 14b. As seen in FIG. 4, the feed bunk 14 is provided with a longitudinal partition 14c; and the chutes 15 and 16 are provided, respectively, with lateral diverter means indicated generally at 17 and 18, that include respective diverter panels 19 and 20 which are provided with longitudinal pivots 21 and 22, respectively. Thus, each of the diverter panels may be pivoted between a first position illustrated in FIG. 2 and a second position illustrated in FIG. 4. In the first position the diverter panels 19 and 20 divert feed from the trough to the rear of the feed bunk 14, which is to the right of the longitudinal partition 14c as viewed in FIG. 4; while in the second position the diverted panels divert feed to the front of the feed bunk or to the left of the longitudinal partition 14c as shown in FIG. 4.

As the feed trough reciprocates, the first set of sweep members 23 and a second set of sweep members 24 which are on opposite sides of the feed supply source 13 act to arrest feed as the trough reciprocates so that the feed drops through one or the other of the chutes 15 and 16. Thus, for example, with the trough 10 moving from left to right as indicated by the arrow in FIG. 1, the feed from the supply source 13 is scattered along the length of the trough with the sweeps 23 digging into feed in the trough to arrest it so that the trough slides out from under it and it drops through the chute 15 to the feed bunk 14, while the feed in the trough rides under the sweeps 24. As the trough 10 moves in the opposite direction—i.e., from right to left in FIG. 1—the sweeps 24 dig into the feed and cause it to drop through the chute 16 into the feed bunk 14 while the sweeps 23 override the feed which is deposited in the trough from the supply source 13.

As previously indicated, the present invention is directed to the diverter means 17 and 18, and in particular to mechanism by which the diverter means may be remotely controlled to pivot the diverter panels between the first position, illustrated in FIG. 2, and the second position, illustrated in FIG. 4, and thus control the deposit of feed into the two sides of the feed bunk 14 on opposite sides of the longitudinal partition 14c. This mechanism consists of identical control means 25 and 26 for the diverter panels 19 and 20, respectively, and actuating means 27 which cooperates with the control means 25 and 26 to reverse the diverter panels as will be described.

As best seen in FIGS. 2–4, the control means 26 includes a control arm, indicated generally at 28, having a pivot arm 29 that is journaled in a sleeve 30 in an end wall 16a of the chute 16 which is closest to the feed supply means 13. The control arm 28 has a first end portion 28a at its lower end and a second end portion 28b at its upper end; and the control arm pivot 29 is connected to the diverter shaft 22 by a link 31 and a lever arm 32 on the diverter shaft. As seen in FIG. 2, when the control arm 28 has its first, or lower end 28a nearest to the transverse median plane of the machine the diverter 20 is positioned to divert material through the chute toward the rear of the feed box 14. When the control arm 28 is pivoted in the journal 30 to the position illustrated in FIG. 3, in which the upper, or second end 28b of the control arm is nearer to the median plane, the movement of the control arm acts through the linkage 31–32 to pivot the diverter panel 20 from the first position of FIG. 2 to the second position of FIG. 4.

Referring now particularly to FIGS. 2, 5 and 6, the actuating means 27 includes a housing 33 which has a rear wall 34, side walls 35 and 36, a pair of front plates 37 which define the sides of an upright opening 38, and parallel plates 39 which flank the upright opening.

An actuating fork, indicated generally at 40, consists of a carrier arm 41, a first actuating finger 42 at the bottom of the carrier arm and a second actuating finger 43 at the top of the carrier arm. A rearwardly extending bifurcated pivot arm 44 on the carrier arm 41 receives a pivot 45 which is journaled in the flanking plates 39 of the housing so that the actuating fork 40 may be pivoted about the axis of the pivot 45 between a first position, illustrated in solid lines in FIG. 5, in which the actuating finger 42 is projected and the actuating finger 43 is retracted, and an opposite position in which the finger 43 is projected and the finger 42 is retracted as illustrated in broken lines in FIG. 5. A cross pin 46 (FIG. 5) serves as a stop to limit pivotal movement of the fork 40 in one direction to the position illustrated in solid lines in FIG. 5.

Between the arms of the fork 40 is a cross pin 47, and a tension spring 48 which has one end hooked to a spring anchor 49 in the bottom of the slot 38 has its other end 50 hooked to the pin 47 so that the actuating fork 40 is normally retained in the full line position of FIG. 5 by the spring.

A solenoid, indicated generally at 51, has a plunger 52 provided with a pair of spaced arms 53 in which a pin 54 is mounted to act as a journal for a link 55 which connects the pin 54 to the pin 47. When the solenoid 51 is energized it is capable of overcoming the biasing force of the spring 48 so as to pivot the actuating fork 40 from the full line position of FIG. 5 to the broken line position of FIG. 5.

A first position of the apparatus can be considered to be the position of FIG. 1 and FIG. 4, in which the upper ends of the diverter control arms 28 are closer to the transverse median plane of the structure, and thus closer to the vertical plane of the actuating fingers 42 and 43. With the control arms 28 so positioned, and the actuating fingers positioned as illustrated in FIG. 2 and the full line position of FIG. 5, the feed trough 10 may reciprocate with the diverters constantly in positions of FIGS. 1 and 4. Energizing the solenoid 51 pivots the actuating fork to the broken line position of FIG. 5, and in this position when the control arm on each chute crosses the transverse median plane it strikes the actuating finger 43 so the arm is pivoted from the position of FIGS. 1 and 4 to the position of FIG. 2, and the diverter panels 19 and 20 are similarly shifted. As long as the solenoid remains energized the control arm does not strike the actuating fingers during reciprocation of the trough; but upon deenergization of the solenoid the spring 48 returns the actuating fork to its first position, where, as seen in FIG. 2, the lower end portion 28a of the control arm 28 may strike the finger 42 as it crosses the transverse median plane of the apparatus so as to again reverse the positions of the control arms and the diverters.

Further analysis of the structure shows that the actuating fingers 42 and 43 both occupy a vertical plane which is transverse to the path of travel of the trough 10, and in the particular embodiment illustrated the fingers 42 and 43 are one above the other. Furthermore, each of the control arms 28 is pivoted intermediate its ends so that each of its end portions 28a and 28b may, selectively, occupy a position in which it is closer to the plane of the actuating fork 40 than is a vertical plane through the pivot of the control arm. The end portion of the control arm which is closer to the plane of the actuating fork may cross that plane as the trough reaches one of its limit positions, while the other end of the pivoted control arm does not reach that plane. The pivots 29 for the control arm are in the same horizontal plane with the pivot 45 for the actuating fork, and each of the actuating fingers 42 and 43 when in its projected position is in the path of the corresponding end of each of the control arms.

The foregoing detailed description is given for clearness of understanding only and no unnecessary limitations are to be understood therefrom, as some modifications will be obvious to those skilled in the art.

I claim:

1. In an animal feeding device of the type in which a trough which has longitudinal sides and a discharge chute at each end reciprocates longitudinally between limit positions in a path of travel beneath a central feed supply source and above a feed bunk with each discharge chute being immediately adjacent the feed supply source in one limit position and immediately adjacent an end of the feed bunk in the other limit position, and in which sweep means causes feed received in the trough from the supply source to be discharged through one chute or the other and scattered along the feed bunk as the trough reciprocates, apparatus for selectively diverting feed discharging through a chute laterally to either side of the bunk as it is discharged, said apparatus comprising, in combination:
- a diverter panel pivotally mounted in a chute for movement between first and second inclined positions to direct feed through the chute toward one side or the other of the feed bunk;
- diverter actuating means including spaced first and second actuating fingers which are positioned adjacent a limit position of a chute in a plane normal to the path of travel of the chute;
- means for selectively positioning either one of said actuating fingers in advanced position and the other in a retracted position;
- a control arm mounted immediately adjacent said chute on a control arm pivot which is midway between its ends, said control arm having first and second end portions which are longitudinally aligned, respectively, with the first and second actuating fingers when the latter are in their advanced positions, and said control arm having a first position in which only its first end portion crosses the plane of the actuating fingers during reciprocation of the trough and a second position in which only its second end portion crosses said plane during said reciprocation, whereby when either of said actuating fingers is in its advanced position it is contacted by the corresponding end portion of the control arm only when said end portion is in position to cross said plane, and such contact pivots the control arm to a position in which only the other end portion thereof crosses said plane; and
- means operatively connecting said control arm to said diverter panel so that movement of the control arm between its first and second positions moves the diverter panel between its first and second positions.

2. The apparatus of claim 1 in which the actuating fingers are on opposite ends of a carrier arm which is pivoted intermediate its ends on an axis normal to that of the control arm and in which means are provided for rocking the carrier arm on its axis between first and second positions in each of which one of the actuating fingers is positioned to be contacted by the control arm.

3. The apparatus of claim 2 in which the means for rocking the carrier arm includes a spring normally biasing the carrier arm to the first position, and selectively operable means for rocking the carrier arm against the bias of said spring to the second position.

4. The apparatus of claim 3 in which the selectively operable means comprises a solenoid.

5. The apparatus of claim 1 in which the actuating fingers are positioned one above the other and move generally horizontally between their retracted and their advanced positions, and in which the control arm is inclined about 30° to the vertical in each of the positions so that one end portion of the arm is always closer to the plane of the fingers than is the other end portion.

6. The apparatus of claim 5 in which the actuating fingers are on opposite ends of a carrier arm which is pivoted intermediate its ends on an axis parallel to a side of the trough, and in the same horizontal plane as the control arm pivot, and in which means are provided for rocking the carrier arm on its axis between first and second positions in each of which one of the actuating fingers is positioned to contact the control arm.

7. The apparatus of claim 6 in which the means for rocking the carrier arm includes a spring normally biasing the carrier arm to the first position, and selectively operable means for rocking the carrier arm against the bias of said spring to the second position.

8. The apparatus of claim 7 in which the selectively operable means comprises a solenoid.

9. The apparatus of claim 5 in which the plane occupied by the actuating fingers is immediately adjacent the feed supply source, and there are separate control arms on the two chutes, each of said control arms contacting the actuating fingers in one of the limit positions of the trough.

10. The apparatus of claim 1 in which the plane occupied by the actuating fingers is immediately adjacent the feed supply source, and there are separate control arms on the two chutes, each of said control arms contacting the actuating fingers in one of the limit positions of the trough.

11. The apparatus of claim 1 in which the diverter panel is mounted on a longitudinal axis so that it moves laterally in the chute, and the means operatively connecting the control arm to the diverter panel consists of a linkage system.

References Cited

UNITED STATES PATENTS

| 883,801 | 4/1908 | Harpstrite | 198—67 |
| 3,443,547 | 5/1969 | Ferris et al. | 119—52 |
| 3,331,487 | 7/1967 | Willoughby | 198—68 |

RICHARD E. AEGERTER, Primary Examiner

U.S. Cl. X.R.

198—68